United States Patent Office 2,725,334
Patented Nov. 29, 1955

2,725,334

MODIFIED LANOLIN

Lester I. Conrad, Highland Park, and Kalmen Motiuk, New Brunswick, N. J., assignors to American Cholesterol Products, Inc., Milltown, N. J., a corporation of New Jersey No Drawing. Application November 20, 1951, Serial No. 257,416

4 Claims. (Cl. 167—63)

The invention herein disclosed relates to chemical modifications of lanolin which are the products resulting from the reaction of part or all of the hydroxyl groups of natural lanolin.

Lanolin, which is also known as wool fat, wool wax and adeps lanae, is used extensively in a wide variety of products, such, for example, as baby oils, hair brilliantines, lipstick, industrial and medicinal adhesives, cosmetics, pharmaceutical preparations and emulsions, perfume fixatives, stabilizers and thickeners for cosmetics, textile and industrial lubricants and softening agents, and anti-corrosive and rust preventing compounds. However, the natural lanolin has certain disadvantages which limit its use. Some of these disadvantages include the fact that lanolin is incompletely soluble in mineral oil even in very low concentrations; it is extremely tacky and sticky; it is hydrophilic in the sense that it absorbs water to form water-in-oil emulsions that are viscous and tacky; it can be used only in small percentages in certain types of cosmetics, pharmaceutical and industrial emulsions because of its deleterious effect on the stability of the emulsions; it has a deleterious effect on foaming when used as a super fatting agent in soap and detergents; it has an undesirable, characteristic odor which has to be masked in cosmetics and pharmaceutical preparations; and it has a specific allergenic effect on human skin.

By virtue of the invention herein disclosed, there are provided chemically modified lanolins that have new and valuable properties not found in the natural product; that retain most of the desirable properties of lanolin; and that do not have many of the disadvantages inherent in the natural product. In accordance with the invention lanolin is treated with organic materials such as acids, acid chlorides and, acid anhydrides to convert at least part of the lanolin hydroxy esters into their acyl derivatives and the reaction product is purified by separating out excess acid, catalyst, water soluble impurities and color.

Lanolin consists of esters formed in nature by the combination of numerous organic acids and higher alcohols. It is well known that lanolin has a substantial hydroxyl number. Various lanolins of U. S. P. quality were analysed and were found to have the following hydroxyl numbers: lanolin A, 29.9; lanolin B, 38.8; lanolin C, 27.7; lanolin D, 31.9; lanolin E, 36.7; and lanolin F, 33.8. Although some observers have considered the hydroxyl number of lanolin as indicative of the presence of free alcohols, this line of reasoning is not confirmed by the facts established on analysis. Lanolin is one of the few natural fatty materials that contain a high percentage of esterified hydroxy acids. The substantial hydroxyl number of lanolin can be accounted for only by the hydroxyls of these hydroxy esters. Thus, these hydroxyls undergo, as exemplified by this invention, reactions of hydroxyl groups, such, for example, as acylation, etherification, dehydration, etc. Accordingly, chemically modified lanolins with new and unusual properties are produced when lanolin is treated as hereinafter described.

Acylation, for example, results in marked changes in the chemical and physical properties of lanolin. By reacting lanolin with acetic acid, acetic anhydride, or acetyl chloride under determined conditions, a reaction product is obtained, which reaction product is an acetyl of hydroxyesters. The replacement, thus effected, of the hydrogen of the hydroxyl group by an acetyl radical markedly changes the physical properties of the original lanolin. It is not necessary to convert all the lanolin hydroxy esters into their acyl derivatives. It has been found that conversion of approximately forty to one hundred percent is sufficient to produce a chemically modified lanolin having the desirable properties hereinafter mentioned.

The chemically modified lanolins of this invention have been obtained by the procedure given in the following examples (after each example, there is given a comparison of lanolin and the modified lanolin).

EXAMPLE 1

150 gms. lanolin (OH number 29.9) was mixed with 300 cc. of a pyridine solution containing 75 gms. acetic anhydride and the mixture held for one hour at 94–96° C. After cooling to room temperature, 60 gms. of water were added and the mixture heated to 80° C. and separated into two layers. The upper layer was washed with water to remove acetic acid and then dried at 100° C., 20 mm., in an atmosphere of nitrogen. The purified reaction product is completely soluble in mineral oil (70 viscosity) in concentrations up to 10% at 25° C. On the basis of the hydroxyl number, it is evident that 60% conversion has taken place.

Comparison

| | Hydroxyl Number | Appearance of 10% Mineral Oil Solution at 25° C. |
|---|---|---|
| Lanolin | 29.9 | Cloudy. |
| Modified Lanolin | 11.9 | Clear. |

EXAMPLE 2

10 lbs. lanolin, U. S. P. (Hydroxyl Number 38.8) was treated in a stainless steel kettle at 130–135° C. for one hour with two lbs. acetic anhydride. Continual agitation was maintained in an atmosphere of nitrogen. At the end of one hour the excess of acetic anhydride was converted to acetic acid by the addition of 2 lbs. of water and heating at 100° C. for 10 minutes. The acid was then removed by washing and the modified lanolin dried by distilling off the water using heat and reduced pressure in an atmosphere of nitrogen.

The purified reaction product is completely soluble in mineral oil (70 viscosity) in concentrations up to 10% at 25° C. On the basis of the hydroxyl number, it is evident that 82% conversion has taken place.

Comparison

| | Hydroxyl Number | Appearance of 10% Mineral Oil Solution at 25° C. |
|---|---|---|
| Lanolin | 38.8 | Cloudy. |
| Modified Lanolin | 7.1 | Clear. |

EXAMPLE 3

46 gms. U. S. P. (Hydroxyl Number 33.5) was mixed with 9 gms. acetic anhydride and heated for one hour at 128–138° C. in an atmosphere of nitrogen. The reaction product was washed and dried as in Example 2. The purified reaction product is completely soluble in mineral oil (70 viscosity) in concentrations up to 10% at 25° C. On the basis of the hydroxyl number it is evident that 100% conversion has taken place.

*Comparison*

|  | Hydroxyl Number | Appearance of 10% Mineral Oil Solution at 25° C. |
|---|---|---|
| Lanolin | 33.5 | Cloudy. |
| Modified Lanolin | 0 | Clear. |

The reactions described in the above examples may obviously be carried out by using other acid anhydrides, or acid chlorides, or aliphatic and aromatic acids, instead of acetic anhydride, to produce modified lanolins with various new properties. For instance, the propionic or undecylenic derivatives are of special interest because of the fungicidal and fungistatic properties of the appended acid radical. Similarly, additional new and unique properties may be introduced into lanolin by such acid radicals as ricinoleoyl (important in connection with bromo-acid solvency); benzoyl (anti-septic action); salicyl (anti-pyretic and analgesic properties); and para amino benzoyl (sun screen activity). Modified lanolins containing acyl radicals having special properties such as described above, have been obtained by us using procedures given in the following examples.

EXAMPLE 4

450 gms. lanolin (Hydroxyl Number 31.4) was mixed with 115 gms. propionic anhydride and the mixture heated for one hour at 130–134° C. in an atmosphere of nitrogen. The reaction mixture was washed several times with boiling water and then dried at 120° C. under reduced pressure. The purified reaction product is completely soluble in mineral oil (70 viscosity) in concentrations up to 10% at 25° C.

*Comparison*

|  | Hydroxyl Number | Appearance of 10% Mineral Oil Solution at 25° C. |
|---|---|---|
| Lanolin | 31.4 | Cloudy. |
| Modified Lanolin | 7.0 | Clear. |

EXAMPLE 5

565 gms. lanolin (Hydroxyl Number 29.7) was mixed with 137 gms. ricinoleic acid (acid No. 153), and the mixture heated for eight hours at 142–150° C. at reduced pressure in the presence of 6 gms. p-toluenesulfonic acid. The reaction was continued until practically all the free acid was used up, and the reaction product was subsequently washed with methanol and dried by heating at 135° C., 35 mm. The purified reaction product was completely soluble in mineral oil (70 viscosity) in concentrations up to 10% at 25° C.

*Comparison*

|  | Hydroxyl Number | Appearance of 10% Mineral Oil Solution at 25° C. |
|---|---|---|
| Lanolin | 29.7 | Cloudy. |
| Modified Lanolin | 14.6 | Clear. |

EXAMPLE 6

267 gms. lanolin (Hydroxyl Number 31.4) was mixed with 102 gms. of benzoic anhydride and heated for one hour at 130–140° C. in an atmosphere of nitrogen. 20 cc. of water was then added and the mixture heated at 105° C. for fifteen minutes. The mixture was washed several times with ethanol at 50° C. and the aqueous-ethanol fraction discarded. The purified reaction product was then dried at 108° C. and 5 mm. The reaction product was completely soluble in the mineral oil (70 viscosity) in concentrations up to 10% at 25° C.

*Comparison*

|  | Hydroxyl Number | Appearance of 10% Mineral Oil Solution at 25° C. |
|---|---|---|
| Lanolin | 31.4 | Cloudy. |
| Modified Lanolin | 16.8 | Clear. |

The modified lanolins described above will vary in properties depending on the particular acyl group present. Thus, in the case of the acetate, practically all of the desirable properties of lanolin are retained, and, in addition, it is completely soluble in mineral oil (70 viscosity) in concentrations up to ten percent at twenty-five degrees centigrade (room temperature); it is not tacky and leaves a desirable waxy film on skin, metal, leather, etc.; it is extremely hydrophobic, resisting emulsification with water and, therefore, does not become tacky in the presence of water; it may be used in higher percentage in cosmetics, pharmaceutical and industrial emulsions to give greater emollience and softening with no deleterious effect on the emulsion; it may be used as a super fatting agent in high concentrations in soap and detergents without any deleterious effect on foaming; it contains little or no hydroxy esters and, therefore, more closely resembles the fats of the human sebum than does lanolin; appears to have little or no allergenic activity; and it is practically odorless.

Among the industries in which the above mentioned properties of the modified lanolin of this invention are of great value are, cosmetic, pharmaceutical, automotive, textile, paint, ink, plastic, rubber, fuels, and leather. The properties mentioned are of particular importance when the product is admixed with mineral oil (baby oils, for example), hair brilliantines, lipsticks, industrial and medicinal adhesives, cosmetic and pharmaceutical preparations and emulsions of all types, perfume fixatives, stabilizers and thickeners for cosmetics, textile and industrial lubricants and softening agents, and anti-corrosive and rust-preventing compounds.

A particular example of the advantage of the modified lanolin of this invention over the natural product lanolin is in its mixture with mineral oil, for example, baby oil products wherein it is highly desirable to add an emollient to the mineral oil used. Manufacturers of baby oils must process their product at great lengths and expense to remove the insoluble lanolin fractions and, as a result, their final product is often expensive yet deficient in emollient content. With the modified lanolin of this invention, such processing is not necessary and the emollient content is certain. The invention comprehends a mixture of a mineral oil and the chemically modified lanolin described.

In the case of the propionate, due to the known fungicidal activity of the acyl group there is indicated the additional valuable property of a fungicidal activity.

New and valuable properties are to be expected in the case of the ricinoleate due to the presence of the hydroxy-acyl radical which is important in the formulation of lipsticks, hair-grooms, and many other cosmetic, pharmaceutical and industrial products.

In the case of the benzoate an antiseptic activity is to be expected in addition to many of the new properties as listed above for the acetate.

It will be apparent to those skilled in the art that the use of organic acids, acid anhydrides and acid chlorides are interchangeable wherever one is mentioned. Also, it should be apparent that by reacting a modified lanolin under specific chemical or physical conditions or both, it can be converted to an ether-like product.

When the phrase "separated from the unreacted material" is used in the appended claims, it is intended to mean that the product is purified, i. e. separated from, for example, excess acid, any catalyst used, water soluble impurities and color.

We claim:

1. A chemically modified lanolin especially suitable for pharmaceutical and cosmetic use on the skin, which modified lanolin is free of side reaction materials and consists of the product resulting from the reaction of forty to one hundred per cent of the hydroxyl groups of lanolin with one of the group consisting of acetic anhydride, propionic anhydride, ricinoleic acid and benzoic anhydride, washing out excess acylating agent with a wash media, and removing the residual wash media, residual acid and side reaction materials by vacuum distillation; the product being characterized by the facts that it is practically odorless and is completely soluble in mineral oil in concentrations up to ten percent at a temperature of twenty-five degrees centigrade.

2. A chemically modified lanolin especially suitable for pharmaceutical and cosmetic use on the skin, which modified lanolin is free of side reaction materials and consists of the product resulting from the reaction of forty to one hundred percent of the hydroxyl groups of lanolin with acetic anhydride followed by washing with water, and removing the residual water, residual acid and side reaction materials by vacuum distillation, the product being characterized by the facts that it is practically odorless and is completely soluble in mineral oil in concentrations up to ten percent at a temperature of twenty-five degrees centigrade.

3. A chemically modified lanolin especially suitable for pharmaceutical and cosmetic use on the skin, which modified lanolin is free of side reaction materials and consists of the product resulting from the reaction of forty to one hundred percent of the hydroxyl groups of lanolin with propionic anhydride, washing out the excess acylating agent with water, and removing the residual water, residual acid and side reaction materials by vacuum distillation, the product being characterized by the facts that it is practically odorless and is completely soluble in mineral oil in concentrations up to ten percent at a temperature of twenty-five degrees centigrade.

4. A new composition especially suitable for pharmaceutical and cosmetic use on the skin, which composition comprises a mixture of mineral oil and up to ten percent of a product resulting from the reaction of forty to one hundred percent of the hydroxyl groups of lanolin with one of the group consisting of acetic anhydride, propionic anhydride, recinoleic acid and benzoic anhydride, washing out the excess acid with a wash media, and removing the residual wash media, residual acid and side reaction material by vacuum distillation, the composition being characterized by the fact that it constitutes a clear solution at twenty-five degrees centigrade without the addition of a solubilizer.

References Cited in the file of this patent

Lewkowitsch: Chemical Technology and Analysis of Oils, Fats and Waxes (1909), McMillan & Co., London, vol. I, page 336, and vol. II, page 750.

H. Bennett: The Cosmetic Formulary, Chemical Pub. Co., New York (1937), page 70.